US009988292B2

(12) United States Patent
Kellar et al.

(10) Patent No.: US 9,988,292 B2
(45) Date of Patent: Jun. 5, 2018

(54) WASTEWATER TREATMENT COMPOSITIONS

(75) Inventors: Kenneth Edmund Kellar, Blue Ridge, VA (US); Megan Allen, Fincastle, VA (US); Christina Edwards, Boones Mill, VA (US); Emily Looze, Bedford, VA (US); Larry Overstreet, Roanoke, VA (US)

(73) Assignee: NOVOZYMES BIOLOGICALS, INC., Salem, VA (US)

( * ) Notice: Subject to any disclaimer, the term of this patent is extended or adjusted under 35 U.S.C. 154(b) by 1061 days.

(21) Appl. No.: 13/279,869

(22) Filed: Oct. 24, 2011

(65) Prior Publication Data

US 2012/0097889 A1    Apr. 26, 2012

Related U.S. Application Data

(60) Provisional application No. 61/435,455, filed on Jan. 24, 2011, provisional application No. 61/425,060, filed on Dec. 20, 2010, provisional application No. 61/406,746, filed on Oct. 26, 2010.

(51) Int. Cl.
C02F 3/34       (2006.01)
C02F 5/10       (2006.01)

(52) U.S. Cl.
CPC .......... C02F 3/342 (2013.01); C02F 3/34 (2013.01); C02F 2303/02 (2013.01); C02F 2303/14 (2013.01); C02F 2307/08 (2013.01)

(58) Field of Classification Search
CPC ...... G01N 33/56911; C12N 1/20; C12N 3/00; C02F 2303/14; C02F 2307/08; C02F 3/34; C02F 3/342; C02F 2303/02; C11D 3/386
USPC ........... 435/189, 194, 220, 23, 7.4; 510/392, 510/393; 252/181
See application file for complete search history.

(56) References Cited

U.S. PATENT DOCUMENTS

| | | | |
|---|---|---|---|
| 3,720,606 A | 3/1973 | Homey | |
| 4,655,794 A | 4/1987 | Richardson | |
| 5,102,422 A * | 4/1992 | Christner et al. | 8/94.15 |
| 5,284,587 A | 2/1994 | Wong et al. | |
| 5,905,037 A | 5/1999 | Cooney, Jr. | |
| 6,325,934 B1 | 12/2001 | Tobey, Jr. | |
| 2010/0129294 A1 * | 5/2010 | Chen | A61K 9/0019 424/45 |

FOREIGN PATENT DOCUMENTS

| | | |
|---|---|---|
| CN | 1613798 | 5/2005 |
| CN | 101693775 | 4/2010 |
| CN | 101812440 A | 8/2010 |
| EP | 0388115 A1 | 9/1990 |
| FR | 2482130 A1 | 11/1981 |
| JP | 6340899 A | 12/1994 |
| JP | 10-309311 A | 11/1998 |
| JP | 10313853 A | 12/1998 |
| JP | 2007-000831 A | 1/2007 |
| WO | 93/21298 A1 | 10/1993 |
| WO | 2007/104268 A1 | 9/2007 |

OTHER PUBLICATIONS

Salminen et al. 2004. Potential for aerobic and anaerobic biodegradation of petroleum hydrocarbons in boreal subsurface. Biodegradation, vol. 15, pp. 29-39.*
Cummisford, R. 2009. Columbus Vegetable Oils Material Safety Data Sheet Mineral Oil. May 26, 2009. pp. 1-5.*
Ultraclear of Ohio. 2004. Ultraclear ABI. Biological solutions for treating water. Copyright@2004-2015 Yelp Inc. Yelp. http://ultraclear.com/ucgp.html printed Feb. 28, 2015.*
Suehara et al. 2005. Biological Treatment of Wastewater Discharged from Biodiesel Fuel Production Plant with Alkali-Catalyzed Transesterification. Journal of Bioscience and Bioengineering, vol. 100, pp. 437-442.*
Shubhada et al.1993. Borate ion-assisted stabilization of β-galactosidase from Aspergillus oryzae by polyhydroxy compounds in water-miscible organic solvents. Enzyme and Microbial Technology, vol. 15, No. 10, pp. 881-886.*
Anonymous, 2006, Ultra Clear GelPac LS for Grease Reduction, pp. 1-2.
Grumman Aerospace Corporation, 1970, Development of Immobilized Enzyme Systems, 1-67.
Madamwar et al, 2004, Appl Biochem Biotechnol 118(1-3), 361-369.
Zoumpanioti et al, 2010, Biotechnol Adv 28(3), 395-406.

* cited by examiner

*Primary Examiner* — Louise W Humphrey
*Assistant Examiner* — Kailash C Srivastava
(74) *Attorney, Agent, or Firm* — Todd Sladek

(57) ABSTRACT

The present invention relates to compositions containing concentrated biologically-active ingredients for treating wastewater in systems such as septic tanks, cesspools, and sewage systems.

20 Claims, 4 Drawing Sheets

WASTEWATER TREATMENT COMPOSITIONS

CROSS-REFERENCE TO RELATED APPLICATIONS

This application claims the benefit under 35 U.S.C. 119 of U.S. provisional application Nos. 61/406,746 and 61/425,060 and 61/435,455 filed Oct. 26, 2010, Dec. 20, 2010, and Jan. 24, 2011, respectively, the contents of which are fully incorporated herein by reference

FIELD OF THE INVENTION

The present invention relates to compositions containing concentrated biologically-active ingredients for treating wastewater in systems such as septic tanks, cesspools, and sewage systems.

BACKGROUND OF THE INVENTION

Biological wastewater treatment compositions containing isolated enzymes and/or microorganisms are used in treating wastewater systems, such as, for example, septic tanks cesspools, and sewage systems. These treatment compositions are effective in breaking down solids present in the wastewater system (e.g., in the wastewater stream, holding tanks and pools), and are particularly useful in, among other things, producing a cleaner/clearer effluent, reducing odor, and permitting less maintenance of such wastewater systems by reducing the interference of the solids in the treatment process/wastewater stream flow (e.g., due to solids interfering in movement of wastewater in tanks, pools, conduits, exits/openings, pipes, etc.).

Biological treatment compositions used in the industry can generally be classified as either powder formulations or liquid formulations. Both have their advantages and disadvantages in production and usage. Powder formulations are described, e.g., in U.S. Pat. No. 6,325,934 and French Patent Application No. 80-10585 (Publication No. 2482130). Liquid formulations are described, e.g., in U.S. Pat. Nos. 3,720,606, 4,655,794 and 5,905,037.

A continued challenge faced in the field of biological treatment compositions is providing biological wastewater treatment compositions which effectively maintain or preserve the activity of the isolated enzymes and/or microorganisms (i.e., the active ingredients) in effective/consistent amounts for application, while also providing convenient application under diverse conditions. Although the activity of the isolated enzymes and/or microorganisms must be maintained for potential application, for many of the biologically-active ingredients, activity must also be effectively controlled so that such activity is essentially only effectively initiated upon application.

In addition, isolated enzymes and microorganisms each face different challenges for creating an effective treatment composition as these individual active ingredients can also interact with each other, thereby reducing or eliminating the activity of at least one of the ingredients. Preferred biological treatment compositions also typically contain multiple different classes of isolated enzymes and different species of microorganisms, which further complicates the development of effective treatment compositions due to their actual and potential interactions. Thus, when different active ingredients are combined together for use in a wastewater treatment composition, additional complications must be addressed based on their actual or potential interactions. The wastewater treatment compositions of the prior art traditionally use a number of environmentally unfriendly ingredients (e.g., stabilizers and preservatives) to control or reduce undesirable interactions of the active ingredients.

In addition to the above challenges, an ever increasing challenge in the field is providing environmentally safe and friendly wastewater treatment compositions. In order to accomplish this, it is important to eliminate or reduce common stabilizers and/or preservatives which then present additional challenges as these ingredients are used to control or reduce unwanted undesirable interactions of enzymes and/or microorganisms.

Another challenge is to provide more concentrated products with respect to the active ingredients, e.g., to save on resources and improve handling (storage space and transportation costs). Concentration of a product containing both isolated enzymes and microorganisms is again a particularly difficult challenge, because it places these active ingredients in closer contact with each other, thereby increasing the likelihood of undesirable interactions. It is even more of a challenge to concentrate such a product while at the same time reducing or even eliminating environmentally undesirable or costly stabilizers/preservatives.

There accordingly remains a need in the art for environmentally-friendly, consumer-friendly, and effective biological waste water treatment compositions.

SUMMARY OF THE INVENTION

The present invention is directed to flowable, organic-based gels comprising concentrated biologically-active ingredients for wastewater treatment. The gel compositions ("organogels") of the present invention are environmentally-friendly, e.g., permitting the reduction in both undesirable ingredients (e.g., borates used to stabilize biologically-active ingredients) and reducing the size of the dosage forms commonly used in the art (by concentrating the biologically-active ingredients). The gel compositions are also consumer-friendly in that they provide easy to apply dosage forms having concentrated biologically-active ingredients. The concentrated wastewater compositions of the present invention have several advantages over many other commercially-available products, including that they are easier and more convenient to use, they take up less shelf space (both in the consumers' households and in the establishment where the products are sold), and many applications/doses can be stored in a single container, thereby reducing the cost and environmental costs of large container (e.g., transportation and storage necessities, as well as less environmental impact arising from disposal). In addition, the gel compositions of the present invention provide these benefits and others while maintaining effective biological waste water treatment results.

In one aspect, the wastewater compositions of the present invention are directed to flowable, organic-based gels, comprising:

(a) at least one flowable, organic gel forming ingredient;

(b) a wastewater treatment effective amount of at least one biologically-active ingredient, wherein the at least one biologically-active ingredient is stably and uniformly suspended in the gel and wherein the biologically-active ingredient is concentrated so to be present in about in an amount of about 15% to about 45% by weight of the gel, and wherein gel has a shear-thinning viscosity and a yield value such that:

(i) the least one biologically-active ingredient does not redistribute in the gel (other than from diffusion) and thus remains substantially uniform in the gel during standing and until the force of gravity of buoyancy is applied that exerts a force greater than the yield stress (from yield value), and (ii) the gel is a flowing liquid when in contact with an aqueous environment of the wastewater.

The organogel is also characterized as "phase-stable" showing no observable or low separation or syneresis over the temperature range of 5° C. to 45° C. and also with respect to at least one freeze-thaw cycle.

The at least one biologically-active ingredient comprises at least one isolated enzyme and/or at least one microorganism, and in preferred aspects, multiple enzymes and/or multiple microorganisms. In one aspect, the at least one microorganism is selected from the genus Bacillus, Cellulomonas, Paenibacillus, Pseudomonas, and any combination thereof.

In one aspect, the at least one enzyme is a hydrolytic enzyme, and in another aspect, the at least one enzyme is selected from the group consisting of one or more amylases, cellulases, lipases, proteases, and any combination thereof.

Because of the concentrated nature of the products of the present invention and the gel composition, the biologically-active components are preferably utilized in the form of stable, bacterial spores and the enzymes are in solid form, such as, granular form.

Although the compositions of the present invention may comprise desired amounts of other ingredients (enzyme stabilizers, builders, surfactants, preservatives, antioxidants, etc.), due to stability provided by the gel compositions, the organogel compositions of the present invention permit the substantial reduction or elimination of ingredients traditionally necessary to stabilize the biologically-active ingredients, such as, borates and other enzyme stabilizers or preservatives used in liquid compositions which are not generally necessary for stabilizing the biologically-active ingredients of the present invention. Accordingly, in an embodiment, the gel does not comprise any stabilizer (e.g., borate) for the biologically-active ingredient (i.e., other than the gel itself which stabilzes the biologically-active ingredients).

As the present compositions provide uniform distribution/ suspension of the biologically-active ingredients, advantageously there is no need for the consumer to shake or mix to provide a uniformly-distributed product suitable for effective application.

The organogel compositions of present invention are in one aspect contained within in a sealed (closed) water-soluble container for storage and application. The water-soluble container (packaging) comprises at least one water-soluble film. The water soluble container may also contain multiple films (such as, two films, three films), preferably, also water-soluble films. The at least one water soluble film is stable, that is, it maintains it structural integrity (not dissolving or rupturing) in the absence of a sufficient amount of water over a temperature range of 5° C. to 45° C. and also with respect to at least one freeze-thaw cycle. In this aspect, the organogel remains in the sealed, water-soluble container (at least one water soluble film) until applied, such as, in a septic tank, cesspool, or sewage system. When in contact with a sufficient amount of water, the at least one water-soluble container (e.g., at least one water soluble film) dissolves, thereby releasing the gel and the biologically-active ingredients suspended within the gel.

Thus, the present invention provides in another aspect, an organic-based gel dosage form for wastewater treatment, comprising:

(a) a water soluble container comprising at least one water soluble film forming a sealed container, (b) at least one flowable, organic gel forming ingredient contained within said water soluble container, and (c) a wastewater treatment effective amount of at least one biologically-active ingredient, wherein the at least one biologically-active ingredient is stably and uniformly suspended in the gel and wherein the biologically-active ingredient is concentrated so to be present in an amount of about 15% to about 45% by weight of the gel, and wherein gel has a shear-thinning viscosity and a yield value such that:

(i) the least one biologically-active ingredient does not redistribute in the gel (other than from diffusion) and thus remains substantially uniform in the gel during standing and until the force of gravity of buoyancy is applied that exerts a force greater than the yield stress (from yield value), and (ii) the gel is a flowing liquid when in contact with an aqueous environment of the wastewater.

DETAILED DESCRIPTION

Figure 1:
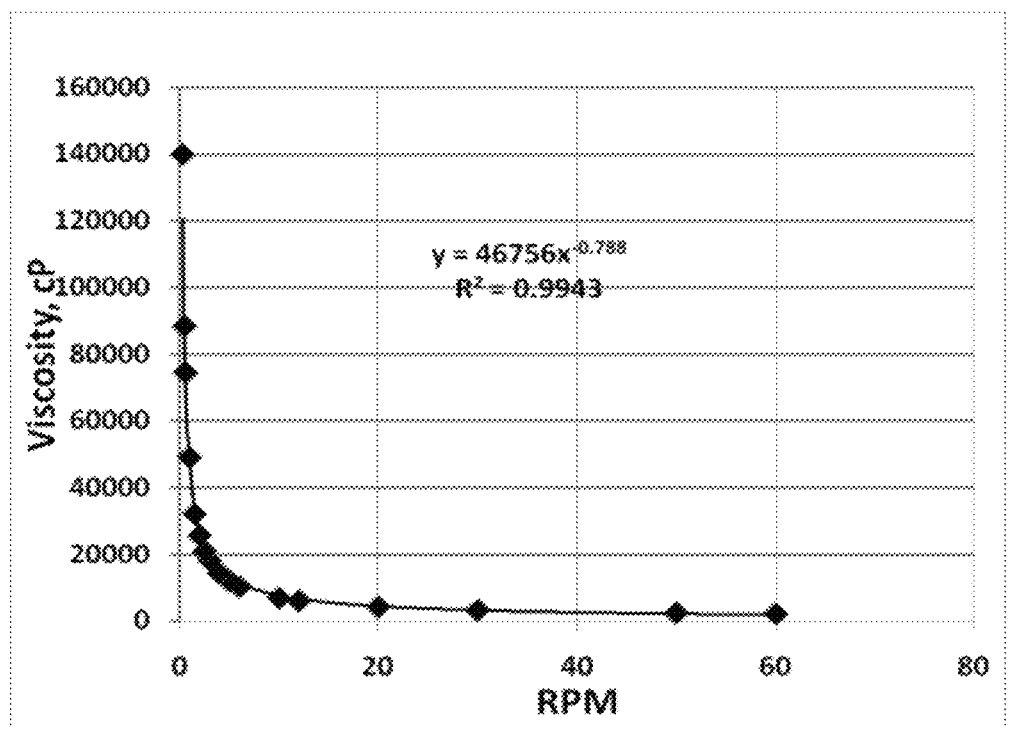
FIG. 1 is a graphical representation illustrating the viscosities of the formulation measured at 20° C. as a function of Spindle rotations-per-minute (rpm).

As used herein, "wastewater" refers to any aqueous waste streams or systems, such as, e.g., septic tanks, cesspools, and sewage systems. The selection of enzymes and/or microorganisms will depend on the contents of the wastewater to be treated.

As used herein, "a flowable gel" means that the gels of the present invention exhibit no or minimal flow when standing, but flows when a shearing force is applied to it, such as, during manufacturing and dispensing into water-soluble containers or other containers, or application in the wastewater. The gel will also "break apart" when applied in the wastewater (e.g., poured, pumped or otherwise released into the aqueous environment of the wastewater, such as, when the water-soluble containers dissolve in the aqueous environment of the wastewater) so as to effectively distribute the active ingredients in the aqueous environment encountered in treatment of the wastewater system.

As used herein, a "phase-stable gel" is a gel showing no observable or low separation or syneresis over the temperature range of 5° C. to 45° C. and also with respect to at least one freeze-thaw cycle, such as, at least two, at least three, at least four, at least five or at least six freeze-thaw cycles. Any separation or syneresis (e.g., occurring during shipping or storage) can be substantially eliminated when the gel is shaken or another moderate force, such as, e.g., stirring, is applied by a user.

As used herein, the "shear-thinning viscosity" of the gels of the present invention refers to the pseudo plastic-like property of the gel such that the gel upon application of a shear stress (e.g., from pumping or pouring, dispensing during manufacture or distribution into the wastewater) changes viscosity and becomes less thick and flows more like water.

As used herein, the "yield value" refers to the minimum amount of shear stress (such as, as a result of application by pumping, pouring or other distribution into the wastewater) necessary before the flow of the gel begins.

As used herein, "homogeneously" or "uniformly" suspended (distributed) refers to the composition of the gel such that the biologically-active ingredient(s) do not significantly redistribute in the gels of the present invention (other than from diffusion) unless the force of gravity of buoyancy can exert a force greater than the yield stress (from yield value) for application. Diffusion of the biologically-active ingredients in the gels is generally homogenous and therefore does not (or does not substantially) contribute to non-uniformity in the gels.

The gel is preferably formed of an organic solvent (including one or more organic solvents). As used herein, an "organic solvent" is a compound comprising at least 1 carbon atom, has low volatility and is in a liquid form at room temperature. The organic solvent is preferably biodegradable, more preferably anaerobically biodegradable. In preferred embodiments, the organic solvent is a "Low Vapor Pressure Volatile Organic Compounds (LVP-VOC)," which is a chemical "compound" or "mixture of compounds" containing (1) a vapour pressure less than 0.1 mm Hg at 20° C., (2) composed of chemical compounds with more than 12 carbon atoms and/or (3) a boiling point greater than 216° C. See also, the definition of LVP-VOC provided by the California Air Resources Board (CARB).

Examples of organic solvents for use in the present invention include, e.g., mineral oils, hexylene glycol, glycerol, linoleic acid, oleic acid, any combination thereof. An example of a commercial mineral oil includes BRITOL 50 (available from Sonneborn, Inc., Mahwah, N.J.).

When preparing such solvents (alone or combinations of solvents) and the gels of the present invention in general, the solvent and ultimate gels should preferably provide an environment such that the at least one enzyme (if an enzyme is used) retains at least 60 percent of its initial activity after storage at 30° C. for at least eight weeks, and for at least one microorganism (e.g., bacterial spore) (if a microorganism is used) should preferably not have more than 1-log loss of the original viable content over a one year period.

In preferred embodiments, the gel is formed from the combination of at least one organic solvent and at least one gelling agent. As used herein, a "gelling agent" is used in combination with the organic solvent to form the gels of the present invention. Examples of gelling agents for use in the present invention include, e.g., hydrophobically-modified clays (such as, e.g., sodium montmorillonite where exchangeable sodium ions are replaced with organic cationic molecules, such as, alkylamines), surface modified silicas, or a fumed silicas. An example of a commercially available fumed silica is KONOSIL K-200 (available from DC Chemical Co. Ltd).

The gel is formed by high shear mixing of the organic solvent and gelling agent (e.g., for laboratory-scale preparations in a kitchen-style blender, or for commercial-scale preparations in a high shear in-line or in-tank mixer and optionally using a high-shear pump). In an embodiment, the organogel is formed of about 95 to about 99 percentage weight of the organic solvent (when measuring the contents of the organogel independent of any ingredients, including biologically-active ingredients) and about 1 to about 5 percentage weight of the gelling agent or gelling agents (again when measuring the contents of the organogel independent of any other ingredients).

As used throughout this specification, the terms "parts by weight" or "percentage weight" are used interchangeably in the specification wherein the weight percentages of each of the individual constituents are indicated in weight percent based on the total weight of the particular gel composition of which it forms a part.

As used herein, "at least one biologically-active ingredient" means at least one enzyme and/or at least one microorganism (preferably, bacterial spore), preferably a combination of at least one enzyme and at least one microorganism, more preferably a combination of multiple (more than one) enzymes and multiple (more than one) microorganisms. The at least one biologically-active ingredient may be added to the organic solvent prior to addition of the gelling agent, or preferably added after formation of the gel.

Any enzyme useful for wastewater treatment may be used, including, enzymes which are effective in reducing or eliminating solids. Examples of such enzymes include hydrolase enzymes, which are capable of hydrolyzing material present in wastewater. Exemplary enzymes include cellulases, amylases, proteases, lipases and combinations thereof. These enzymes, as well as commercially available enzymatic preparations comprising these and other enzymes useful for treating wastewater are known to the art and are available from a variety of commercial suppliers.

Enzymatic preparations may in alternative to commercial enzyme preparations also be produced by conventional methods, such as, e.g., by isolation from a microorganism or other suitable source (e.g., plant) which is known to produce or has been modified to produce the desired enzyme or enzymes.

The enzymes of the present invention are isolated, that is, they have been purified using art known techniques for purifying enzymes from the organism for use independent from the organism. The purity of the enzyme may vary depending on the method used and purity desired, and the enzyme may range from a low purified to highly purified enzyme composition, as is known in the art.

The enzymes may also be prepared synthetically as is well known in the art by producing a nucleic acid sequence encoding the desired enzyme, and inserting that nucleic acid sequence in to a suitable production host, as is well known in the art.

In one embodiment, the biologically-active ingredient comprises a cellulase. A cellulase is a term generally used to describe the group of enzymes which hydrolyze cellulose. Cellulases include one or more subcategories of enzymes which hydrolyze cellulose which subcategories such as, endocellulases, exocellulases, beta-1,3-glucanases and beta-glucosidases. In the compositions and processes according to the present invention, any of these cellulases may be used alone or in combination but are used preferably in combination.

Preferred cellulases for use include those which are derived from microorganisms of the genus *Aspergillus, Cellulominas, Chrysosporium, Clostridium, Fusarium, Penicillium, Ruminococcus, Sporotrichium, Thielavia*, and *Trichoderama*. Cellulases are also known to be produced by genetically engineered microorganisms of the genus *Bacillus*. Particularly preferred microorganisms useful as a source of a cellulase include *Aspergillus aculeatus, Aspergillus niger, Bacillus lentus, Bacillus subtilis*, and *Trichoderma longibrachiatum*. Commercial sources for these cellulases are well known. Examples include those marketed under the tradenames MAXICEL, CELLUCLAST 250 1 and CELLUCLAST 100 1 (available from Novozymes, Denmark). Cellulases used in the invention may also be prepared from fungi, which are known to produce cellulase.

Lipases may be used in the compositions of the present invention, e.g., for the reduction of fats and oils present in wastewater. Fats which are particularly susceptible to decomposition by lipases find their origin in animal or plants. Such fats are generally deposited as food residues which are introduced into a drain and drain conduit as they are expected to constitute an appreciable portion of a wastewater. Fats and oils, particularly those which are solidified in a non-fluid form are also known to be an extremely difficult deposit to remove due to the hydrophilic nature of fats which resist dissolution in water.

In the compositions according to the invention, any lipase which is effective in the degradation of fats or oils from animals or plants may be used. Useful lipases may be derived from a variety of sources, including, e.g., microorganisms of the genus *Aspergillus, Candida*, and *Rhizomucor*. Particularly preferred microorganisms include those which include *Aspergillus niger, Aspergillus oryzae, Candida rugosa*, and *Rhizomucor miehei*.

Various commercially available lipase containing preparations are available. Lipases may also be prepared from certain fungi, which are known to produce lipases, and such lipases harvested from fungi may also be used in the compositions of the invention.

Proteases may also be used in the compositions of the present invention. Proteases are effective in breaking down proteins, particularly animal proteins. Useful proteases may be derived from a variety of sources, including, e.g., microorganisms such as those of genus *Aspergillus* and *Bacillus*. Particularly, proteases derived from microorganisms *Aspergillus niger, Aspergillus oryzae, Bacillus licheniformis*, and *Bacillus subtilis* are advantageously used.

Amylases may also be used in compositions of the present invention. Amylases useful in the present invention are those which are effective in the breakdown of starches. Such useful amylases include, e.g., alpha-amylases, beta-amylases, iso-amylases, pullulanases, maltogentic amylases, amyloglucosidases, and glucoamylases. Useful amylases may be obtained from a wide variety of sources, including, e.g., microorganisms of the genus *Aspergillus, Bacillus*, and *Rhizopus*. By way of non-limiting example, specific microorganisms include *Aspergillus niger, Aspergillus oryzae, Bacillus amyloliquefaciens, Bacillus licheniformis, Bacillus stearothermophilus, Bacillus subtilis, Rhizopus niveus*, and *Rhizopus oryzae*. Specific examples of amylase for use in the present invention include *Bacillus acidopullulyticus* alpha-amylase, *Bacillus megaterium* alpha-amylase, and *Bacillus stearothermophilus* alpha-amylase.

In addition to the above enzymes, other enzymes may also be used alone or in combination with any of the above, such as, e.g., pectinases, xylanases, and other carbohydrases, beta-glucanases, and hemicellulases. Pectinases, e.g., are effective in decomposing fruit containing wastes, carbohydrases are effective in breaking down non-starch polysaccharides, beta-glucanase are effective in breaking down vegetable gums, and xylanase are effective in breaking down various types of polymeric gums and natural polymers.

In a preferred embodiment, the enzyme for use the gel comprises the commercial enzymes SAVINASE 16.0 T TYPE W (protease available from Novozymes A/S), ALPHA AMYLASE SC 400 MG (alpha-amylase available from Novozymes A/S) and CELLUZYME 0.7 T (cellulase available from Novozymes A/S).

The enzymes are applied in effective amounts, which may be determined by standard activity assays. The enzymes are preferably applied in the organogel compositions of the present invention in solid form, such as, e.g., in the form of enzymes granules. In this form, they maybe uniformly suspended at a high enzyme content in the organogel compositions of the present invention, and also retain all or most of their activity.

Microorganisms (preferably as bacterial spores) are also useful for treating wastewater and may be used alone or in combination with enzymes, including the above enzymes. Suitable microorganisms are well known in the art.

In one aspect, the composition includes at least one microorganism which produces at least one enzyme selected from the group consisting of amylases, proteases, lipases and cellulases, and combinations thereof. In another aspect, the composition includes at least one microorganism which produces at least two enzymes selected from amylases, proteases, lipases or cellulases.

As enzyme producing microorganisms, fungi and bacteria are especially preferred for use as the source of enzymes. In an aspect, the at least one microorganism is preferably in the gel in the form of a stable bacterial spore. In an aspect, the at least one microorganism is a spore forming bacteria. In another aspect, the at least one microorganism is from the genus *Bacillus, Cellulomonas, Paenibacillus, Pseudomonas*, and any combination thereof.

Effective dosages of the microorganisms may be determined by routine assays. The microorganisms are preferably applied in the form of a spore. Preferred microorganisms are spore forming, such as, bacterial spore forming.

Due to the stability provided by the gels, the gels may contain concentrated biologically-active ingredients. The term "concentrated" refers to the biologically-active ingredients (in total, that is, all biological active ingredients included in the gel) being present in the gel in an amount of about at least 15% by weight of the gel, such as, at least 20% by weight of the gel, such as, at least 25% by weight of the gel, such as, at least 30% by weight of the gel, such as, at least 35% by weight of the gel, such as, at least 40% by weight of the gel, such as, at least 15% to about 45% by weight of the gel.

A particular advantage of the present invention is that the due to the stability provided by the gels of the present invention, multiple biological active ingredients may be contained in the gels of the present invention in highly concentrated amounts without encountering problems resulting from the interaction of different biologically-active ingredients, which are enhanced when using highly concentrated forms.

Another advantage of the present invention is that the use of concentrated dosages forms may be obtained without the need (or with significantly reduced usage) of preservatives or stabilizing agents. For example, enzyme stabilizing agents such as borates, which are commonly used in liquid products, may be reduced or entirely eliminated in the organogel compositions of the present invention. As such agents are not preferred due to potential environmental impact, the present invention allows the artisan to substantially reduce or eliminate these ingredients. In an embodiment, the gel comprises no stabilizer, such as, borate. The ability to minimize or elimination such ingredients are particularly significant, since this current invention contains enzymes and/or microorganisms that are significantly more concentrated than many products that are commercially available, and thus, the present invention is able to obtain highly concentrated biologically-active ingredient compositions without the need for environmentally-undesirable stabilizer or preservatives.

The dosage and concentrations of the active ingredients in the gels of the invention are, however, interdependent variables which are further influenced by the environment within which the compositions are to be used, as well as the operating parameters of the wastewater treatment vessel (size, configuration, average residence time of wastewater, activity of microorganisms already present in the wastewater treatment vessel, etc.) being treated. Determination of these variables may be accomplished by routine methods, in manners known to the skilled practitioner, and the dosage and concentration of the active ingredients in the compositions may be accordingly established. Further, it is to be understood that wide variations in the dosage amounts and dosing frequency are possible, in which case more frequent and/or multiple dosages would be preferred.

The gel compositions can also include further optional constituents that are physically and/or chemically compatible with the gels of the present invention and which may be present in any amount which is not found to substantially deactivate the biologically-active constituents, or to otherwise act as a food source for the bacteria which is present in the liquid compositions. Exemplary optional constituents include rheology modifying agents including thickeners, preservatives, coloring agents such pigments and dyes, opacifiers, fragrances whether naturally occurring or synthetically produced, fillers, pH adjusting agents, stabilizers, builders, buffers, antioxidants, surfactants for the solubilization of fats and oils, as well as other conventionally known additives. However, as previously discussed, enzyme stabilizing agents, such as, borates, and preservatives may be eliminated in the gels of the present invention.

Further optional constituents which may be included in the gel compositions of the present invention are micronutrients. Such are known to the art as being useful for maintaining the viability of the bacteria in compositions for extended periods of time, i.e., several months. Such micronutrients are known to the art, and include preparations which include calcium salts, magnesium salts and other salts as well.

The organogel compositions of present invention may be contained in any suitable container or packaging. The organogel compositions of present invention are preferably contained within in a sealed (closed) water-soluble container for storage and application. The water-soluble container (packaging) comprises at least one water-soluble film encasing the gel. The water-soluble container or at least one water soluble film is stable and maintains it structural integrity (not dissolving or rupturing) in the absence of a sufficient amount of water over a temperature range of 5° C. to 45° C. and also with respect to freeze-thaw cycles. In this aspect, the organogel remains in the sealed, water-soluble container (at least one water soluble film) until applied, such as, in a septic tank, cesspool, or sewage system. When in contact with a sufficient amount of water, the at least one water-soluble container (e.g., at least one water soluble film) dissolves, thereby releasing the gel and the biologically-active ingredients suspended within the gel.

Any suitable water soluble film material may be used. Such water soluble films can be made from combinations of polyvinyl alcohol and polyvinyl acetate as well as other water-soluble polymeric substances. Commercial sources for such water soluble films include Monosol, LLC (Indiana, USA) and Dupont (Delaware, USA).

The water-soluble container may preferably comprise one or more an additional films (preferably, one or more additional water soluble films) deposed on the at least one water soluble file in contact and containing (encasing) the organogel of the present invention.

The water soluble film and organogel should preferably be compatible for consumer acceptance. As used herein, compatibility includes that the organogel composition should not compromise the ability of the water-soluble film to effectively dissolve at the aqueous destination over at least a six-week period. Potential pathways for the organogel compromising the ability of the water-soluble film in water are dissolution of plasticizers, typically contained in water-soluble films, and dehydration of the water-soluble films (which do contain a small amount of water).

Compatibility also includes that the organogel should also not discolour the water-soluble film or conversely, the water soluble film or water soluble container should not discolour the organogel, such as, over at least a six week period. Discoloration is often indicative of a potential problem with the stability or dissolution of the water-soluble film.

Compatibility also includes that the organogel should also not cause the water-soluble film to elongate, as this can lead to a potential problem with the stability of the water-soluble film, thereby causing problems with product stability, including in storage.

Compatibility further generally includes that the organogel must not compromise the integrity, hardness, color, or water-solubility of the film or films over at least a six week period with conditions of 38° C. and 80% Relative Humidity; 38° C. and 10% Relative Humidity; and ambient temperature and relative humidity. The water-soluble film must also not cause any chemical and/or physical changes to the organogel for the same period of time and conditions.

EXAMPLES

Example 1

A laboratory-scale, organogel product was prepared. The gel was prepared by shear mixing a mineral oil organic solvent (BRITOL 50), a fumed silica gelling agent (KONOSIL K-200), and a coloring agent/dye SOLVAPERM BLUE 2B CLARIANT in a laboratory blender. The gel was allowed to cool to room temperature. The commercial enzymes SAVINASE 16.0T TYPE W (a protease), ALPHA AMYLASE SC 400 MG (an alpha-amylase, and CELLUZYME 0.7 T (a cellulase) (all available from Novozymes) and commercially available bacterial spores (available from Novozymes) were then added to the gel by gentle mixing with a metal spatula until homogenously distributed throughout the gel.

| COMPONENT | WEIGHT PERCENT |
|---|---|
| BRITOL 50 | 77.537 |
| FUMED SILICA KONOSIL K-200 | 1.907 |
| SOLVAPERM BLUE 2B CLARIANT | 0.025 |
| SAVINASE 16.0T TYPE W | 2.600 |
| ALPHA AMYLASE SC 400 MG | 5.126 |
| CELLUZYME 0.7 T | 12.096 |
| SPRAY DRY SB3282 (MF69) | 0.236 |
| SPRAY DRY SB3297 (MF325) | 0.122 |
| SPRAY DRY SB3296 (MF319) | 0.155 |
| SPRAY DRY SB3086 (DA-33) | 0.121 |
| SPRAY DRY SB3295 (MF222) | 0.076 |

Example 2 (Formulation A)

An organogel of the present invention was prepared by shear mixing a mineral oil organic solvent (Britol NF7) and a fumed silica gelling agent (Cab-o-sil M-5) in a laboratory blender. The gel was allowed to cool to room temperature. An enzyme blend containing SAVINASE 16.0T TYPE W (a protease), BAN (*Bacillus amyloliquefaciens* alpha-amylase) and CELLUZYME 0.7 T (a cellulase) (all available from Novozymes) and commercially available bacterial spores (available from Novozymes) were then added to the gel by gentle mixing with a spatula until homogenously distributed throughout the gel. The gel contained the following composition:

| Component | Weight % |
| --- | --- |
| Britol NF7 | 51.3 |
| Cab-o-sil M-5 | 1.9 |
| Enzyme Blend | 46.167 |
| Spore Blend | 0.71 |

Enzyme stability measurements were made for compositions stored at 4° C., Room Temperature (RT) and 30° C. over a period of 20 weeks. Protease activity was measured using the KNPU-S analytical method. Alpha-amylase activity was determined using the KNU-B analytical method. Cellulase activity was determined using the EGU analytical method. Details of these analytical methods are available upon request from Novozymes Biologicals, Salem, Va.

The results are provided below, and indicate that the enzymes maintained good stability when stored at 4° C., Room Temperature (RT) and 30° C. over a period of 20 weeks:

Protease Activity:

| Week | 4° C. | RT | 30° C. |
| --- | --- | --- | --- |
| 0 | 100.00 | 100.00 | 100.00 |
| 2 |  | 76.04 | 76.04 |
| 3 |  | 77.08 | 80.21 |
| 6 | 81.25 | 75.00 | 75.00 |
| 8 |  | 82.29 | 81.25 |
| 20 | 83.33 | 83.33 | 82.29 |

Amylase Activity:

| Week | 4° C. | RT | 30° C. |
| --- | --- | --- | --- |
| 0 | 100.00 | 100.00 | 100.00 |
| 2 | 70.28 | 81.31 | 80.02 |
| 3 |  | 82.64 | 76.73 |
| 6 | 71.10 | 70.47 | 84.54 |
| 20 | 69.75 | 82.09 | 87.28 |

Cellulase Activity:

| Week | 4° C. | RT | 30° C. |
| --- | --- | --- | --- |
| 0 | 100.00 | 100.00 | 100.00 |
| 2 | 99.09 | 93.81 | 89.90 |
| 4 |  | 88.38 | 92.13 |
| 8 |  | 86.90 | 94.22 |
| 20 | 90.02 | 88.46 | 101.36 |

Example 3 (Formulation B)

An organogel of the present invention was prepared by shear mixing a mineral oil organic solvent (Britol NF7) and a fumed silica gelling agent (Konosil) in a laboratory blender. The gel was allowed to cool to room temperature. An enzyme blend containing SAVINASE 16.0T TYPE W (a protease), BAN (*Bacillus amyloliquefaciens* alpha-amylase) and CELLUZYME 0.7 T (a cellulase) (all available from Novozymes) and commercially available bacterial spores (available from Novozymes) were then added to the gel by gentle mixing with a spatula until homogenously distributed throughout the gel. The gel contained the following composition:

| Component | Weight % |
| --- | --- |
| Britol NF7 | 51 |
| Konosil | 2 |
| Enzyme Blend | 46.67 |
| Spore Blend | 0.1 |

Enzyme stability measurements were made for compositions stored at 4° C., Room Temperature (RT) and 30° C. over a period of 21 weeks. Protease activity was measured using the KNPU-S analytical method. Alpha-amylase activity was determined using the KNU-B analytical method. Cellulase activity was determined using the EGU analytical method. Details of these analytical methods are available upon request from Novozymes Biologicals, Salem, Va.

The results are provided below, and indicate that the enzymes maintained good stability when stored at 4° C., Room Temperature (RT) and 30° C. over a period of 21 weeks:

Protease Activity:

| Week | 4° C. | RT | 30° C. |
| --- | --- | --- | --- |
| 0 | 100.00 | 100.00 | 100.00 |
| 1 |  | 108.57 | 110.00 |
| 2 |  | 100.00 | 102.86 |
| 6 |  | 98.57 | 94.29 |
| 12 | 88.57 | 91.43 | 91.43 |
| 21 | 101.43 | 95.71 | 104.29 |

Amylase Activity:

| Week | 4° C. | RT | 30° C. |
| --- | --- | --- | --- |
| 0 | 100.00 | 100.00 | 100.00 |
| 1 |  | 101.75 | 100.20 |
| 4 | 104.72 | 112.53 | 128.84 |
| 6 |  | 113.55 | 113.79 |
| 21 | 112.78 | 117.71 | 116.68 |

Cellulase Activity:

| Week | 4° C. | RT | 30° C. |
| --- | --- | --- | --- |
| 0 | 100.00 | 100.00 | 100.00 |
| 1 |  | 82.75 | 96.67 |
| 2 |  | 74.78 | 81.74 |
| 4 | 59.40 | 69.05 | 77.41 |
| 6 |  | 80.39 | 74.33 |
| 12 | 67.48 | 80.45 | 79.07 |
| 21 | 67.27 | 75.31 | 78.54 |

Example 4 (Formulation C)

An organogel of the present invention was prepared. The gel was prepared by shear mixing a mineral oil organic solvent (Britol NF 50), a fumed silica gelling agent (Konosil), and a coloring agent/dye (Blue Covanor) in a laboratory blender. The gel was allowed to cool to room temperature. An enzyme blend containing SAVINASE 16.0T TYPE W (a protease), BAN (*Bacillus amyloliquefaciens* alpha-amylase) and CELLUZYME 0.7 T (a cellulase) (all available from Novozymes) and commercially available bacterial spores (available from Novozymes) were then added to the gel by gentle mixing with a spatula until homogenously distributed throughout the gel. The gel contained the following composition:

| Component | Weight % |
| --- | --- |
| Britol NF 50 | 77.922 |
| Konosil | 1.998 |
| Blue Covanor | 0.05 |
| Enzyme Blend | 19.321 |
| Spore Blend | 0.71 |

Enzyme stability measurements were made for compositions stored at 4° C., Room Temperature (RT) and 30° C. over a period of 24 weeks. Protease activity was measured using the KNPU-S analytical method. Alpha-amylase activity was determined using the KNU-B analytical method. Cellulase activity was determined using the EGU analytic method. Details of these analytical methods are available upon request from Novozymes Biologicals, Salem, Va.

The results are provided below, and indicate that the enzymes maintained good stability when stored at 4° C., Room Temperature (RT) and 30° C. over a period of 24 weeks:

Protease Activity:

| Week | 4° C. | RT | 30° C. |
| --- | --- | --- | --- |
| 0 | 100.000 | 100.000 | 100.000 |
| 1 |  | 69.565 | 75.000 |
| 4 | 71.739 | 70.652 | 77.174 |
| 6 | 72.826 | 73.913 | 77.174 |
| 12 | 54.348 | 70.652 | 73.913 |
| 24 | 55.435 | 61.957 | 63.043 |

Amylase Activity:

| Week | 4° C. | RT | 30° C. |
| --- | --- | --- | --- |
| 0 | 100.000 | 100.000 | 100.000 |
| 1 |  | 81.931 | 81.911 |
| 4 | 65.401 | 68.147 | 70.384 |
| 6 | 78.905 | 83.250 | 82.256 |
| 12 | 62.029 | 75.226 | 69.393 |
| 24 | 69.538 | 68.840 | 66.147 |

Cellulase Activity:

| Week | 4° C. | RT | 30° C. |
| --- | --- | --- | --- |
| 0 | 100.000 | 100.000 | 100.000 |
| 6 | 116.137 | 111.466 | 131.037 |
| 12 | 111.604 | 130.889 | 110.939 |
| 24 | 110.786 | 124.262 | 112.589 |

Example 5 (Formulation D)

An organogel of the present invention was prepared. The gel was prepared by shear mixing a mineral oil organic solvent (BRITOL NF 50), a fumed silica gelling agent (Konosil), and a coloring agent/dye (Blue Covanor) in a laboratory blender. The gel was allowed to cool to room temperature. An enzyme blend containing SAVINASE 16.0T TYPE W (a protease), BAN (*Bacillus amyloliquefaciens* alpha-amylase) and CELLUZYME 0.7 T (a cellulase) (all available from Novozymes) and commercially available bacterial spores (available from Novozymes) were then added to the gel by gentle mixing with a spatula until homogenously distributed throughout the gel. The gel contained the following composition:

| Component | Weight % |
| --- | --- |
| Britol NF 50 | 78.081 |
| Konosil | 1.838 |
| Blue Covanor | 0.05 |
| Enzyme Blend | 19.321 |
| Spore Blend | 0.71 |

Enzyme stability measurements were made for compositions stored at 4° C., Room Temperature (RT) and 30° C. over a period of 24 weeks. Protease activity was measured using the KNPU-S analytical method. Alpha-amylase activity was determined using the KNU-B analytical method. Cellulase activity was determined using the EGU analytical method. Details of these analytical methods are available upon request from Novozymes Biologicals, Salem, Va.

The results are provided below, and indicate that the enzymes maintained good stability when stored at 4° C., Room Temperature (RT) and 30° C. over a period of 24 weeks:

Protease Activity:

| Week | 4° C. | RT | 30° C. |
| --- | --- | --- | --- |
| 0 | 100.000 | 100.000 | 100.000 |
| 1 |  | 88.889 | 88.889 |
| 4 | 76.543 | 75.309 | 76.543 |
| 12 | 83.951 | 77.778 | 81.481 |
| 24 | 74.074 | 69.136 | 66.667 |

Amylase Activity

| Week | 4° C. | RT | 30° C. |
| --- | --- | --- | --- |
| 0 | 100.000 | 100.000 | 100.000 |
| 1 |  | 91.130 | 104.289 |
| 4 | 81.704 | 71.238 | 76.959 |

| Week | 4° C. | RT | 30° C. |
|---|---|---|---|
| 12 | 74.394 | 72.075 | 68.805 |
| 24 | 85.024 | 69.560 | 72.531 |

Cellulase Activity:

| Week | 4° C. | RT | 30° C. |
|---|---|---|---|
| 0 | 100.00 | 100.00 | 100.00 |
| 1 |  | 97.46 | 102.06 |
| 4 | 105.40 | 91.69 | 90.04 |
| 12 | 87.04 | 73.63 | 64.32 |
| 24 | 95.33 | 91.66 | 94.33 |

Example 6 (Spore Stability)

Spore stability were as measured (by spore counts) for Formulations A, B, C and D stored at Room Temperature (RT) and 30° C. for the period indicated. For the bacterial counts, 1 g of each sample was diluted into 99 mL of phosphate buffer. Each sample was further diluted and plated on an SMA plate. The results are shown below:

| Week | A, RT | A, 30° C. | B, RT | B, 30° C. | C, RT | C, 30° C. | D, RT | D, 30° C. |
|---|---|---|---|---|---|---|---|---|
| 0 | 100.0 | 100.0 | 100.0 | 100.00 | 100.00 | 100.00 | 100.00 | 100.00 |
| 3 | 99.8 | 100.4 | 99.24 | 99.24 |  |  |  |  |
| 12 |  |  |  |  | 97.17 | 97.27 | 94.59 | 94.08 |
| 20 | 99.8 | 100.1 |  |  |  |  |  |  |
| 24 |  |  |  |  | 100.52 | 100.10 | 96.42 | 95.71 |
| 27 |  | 100.7 | 100.65 |  |  |  |  |  |
| 31 | 99.9 | 97.9 |  |  |  |  |  |  |

Example 7

A pilot-production scale, organogel product was prepared. On a pilot scale, using a tank with a horizontally-oriented ribbon blender, the full formulation containing spores and enzymes was prepared. First a gel was prepared: mineral oil organic solvent (BRITOL 50), a fumed silica gelling agent (Konasil K-200), and a pigment (Solvaperm Blue 2B) were exposed to high-shear conditions while still running the ribbon blender at a low speed. The high-shear mixer and ribbon blender were turned off when the gel had a high-enough viscosity. Next, all of the spores and enzymes were added. The ribbon blender was turned back on (without high-shear mixing), and the formulation was mixed until homogenous. 250 gallons of the formulation were prepared by making five 50-gallon batches, combining them into a single container, and mixing the contents for about 10 minutes (to ensure homogeneity) via a diaphragm pump linking hosing taken from the bottom of the container to the top of the container.

The composition of the formulation is as follows.

| Component | Weight % |
|---|---|
| Britol 50 | 73.668 |
| Konasil K-200 | 1.920 |
| Solvaperm Blue 2B | 0.040 |
| Alpha Amylase SC 400 | 7.481 |
| Savinase 16.0T | 2.600 |
| Celluzyme 0.7T | 12.096 |
| Spray Dry SB3282 (MF69) | 0.249 |
| Spray Dry SB3297 (MF325) | 0.499 |
| Spray Dry SB3296 (MF319) | 0.200 |
| Spray Dry SB3086 (DA-33) | 0.499 |
| Spray Dry SB3295 (MF222) | 0.748 |

The density of the formulation was measured by filling two 10 mL volumetric flasks with the formulation and then dividing the weight of formulation by 10. These measurements were done at room temperature (22° C.), and averaged to give a density of 0.989 g/mL.

Viscosities of the formulation were measured at 20° C. as a function of Spindle rotations-per-minute (rpm) using a Brookfield RVDV-E viscometer, using Spindle #27 and an SC4-13R Sample Container. The viscosity (cP) versus rpm data were fit to a power law function (viscosity=$A \times rpm^n$, where A is a constant and n is an exponent). The results from this analysis, along with the raw data, are shown below and illustrated in FIG. 1. The fit of the power law function to the data is good, and the viscosity data can be described by two parameters of a power law function: A=46756 cP, and n=−0.788.

| RPM | Viscosity (cP) |
|---|---|
| 60 | 2233 |
| 50 | 2450 |
| 30 | 3300 |
| 20 | 4260 |
| 12 | 6080 |
| 10 | 7000 |
| 6 | 10330 |
| 5 | 12000 |
| 4 | 14440 |
| 3 | 18250 |
| 2.5 | 21100 |
| 2 | 25900 |
| 1.5 | 32300 |
| 1 | 49300 |
| 0.6 | 74600 |
| 0.5 | 88500 |
| 0.3 | 140000 |

The final physical characteristics, such as shear-thinning behavior of viscosity, the viscosity at low shear rates, and the yield value, of the formulation depend on its composition as well as the process and equipment used for manufacturing. In other words, the final physical characteristics of the formulation are not determined by its composition alone. The following examples will illustrate this.

Example 8

A production scale organogel was prepared. First, a gel was prepared in a tank using mineral oil (Britol 50) as the organic solvent, Konasil K-200 as the fumed silica gelling agent, and a pigment (Solvaperm Blue 2B). The final composition of this mixture was 96.932% Britol 50, 2.875% Konasil K-200, and 0.193% Solvaperm Blue 2B. This mixture was exposed to high shear conditions necessary for dispersing the Konasil K-200, as is well-known for such fumed silica materials. The resulting viscosity data of the gel (not the final formulation) is given below. The viscosities of the gel were measured at 20° C. as a function of Spindle rotations per minute (RPM) using a Brookfield RVDV-E viscometer, using Spindle #27 and the SC4-13R Sample Container.

| RPM | Viscosity (cP) |
|---|---|
| 20 | 9510 |
| 10 | 16430 |
| 5 | 30750 |
| 2 | 69600 |
| 1 | 130300 |
| 0.5 | 240000 |

As was done for Example 7, these data were fit to a power-law function, giving A=129142 cP and n=−0.882. Note that for the power-law function, the value of A should correspond to the Viscosity value at 1 RPM. In this case, the value of A is only −0.897% different from the value of the Viscosity at 1 RPM, thereby validating the use of the power-law function to fit the viscosity data.

The gel was then transferred to a tank containing a ribbon blender, and spores (Spray Dry SB3282 (MF69), Spray Dry SB3297 (MF325), Spray Dry SB3296 (MF 319), Spray Dry SB3086 (DA 33), and Spray Dry SB3295 (MF222), and enzymes Alpha Amylase SC400, Savinase 16.0T, and Celluzyme 0.7T) were added with the speed of the blender being slow enough as not to significantly break down the gel, The mixing time was long enough to have the spores and enzymes distributed evenly throughout the formulation. The blender speed was as slow as possible, and the mixing time was a short as possible so the gel would not be broken down, leading to a final product with an A value and a yield value, that would be too low to suspend the spores and enzymes. This procedure was done four times to produce four final formulations from the original gel described above.

The viscosity data for the four final products were obtained in the same way as the viscosity for the gel, as well as the A Value and the n value, and the data are given below.

| RPM | Viscosity (cP) Batch 1 | Viscosity (cP) Batch 2 | Viscosity (cP) Batch 3 | Viscosity (cP) Batch 4 |
|---|---|---|---|---|
| 20 | 9910 | 8800 | 8700 | 9150 |
| 10 | 17130 | 14950 | 15180 | 15800 |
| 5 | 30300 | 26250 | 27450 | 27150 |
| 2 | 67300 | 58100 | 62900 | 62500 |
| 1 | 132000 | 112800 | 119800 | 120300 |
| 0.5 | 252000 | 224000 | 229000 | 230000 |
| A Value (cP) | 130808 | 113733 | 119621 | 119517 |
| n Value | −0.880 | −0.887 | −0.890 | −0.878 |

The final composition of the four final products was identical, and is given below.

| Component | Weight Percent |
|---|---|
| Britol 50 | 75.760 |
| Konasil K-200 | 2.247 |
| Solvaperm Blue 2B | 0.151 |
| Alpha Amylase SC 400 | 6.080 |
| Savinase 16.0T | 2.600 |
| Celluzyme 0.7T | 12.095 |
| Spray Dry SB3282 (MF69) | 0.2134 |
| Spray Dry SB3297 (MF325) | 0.2134 |
| Spray Dry SB3296 (MF319) | 0.2134 |
| Spray Dry SB3086 (DA-33) | 0.2134 |
| Spray Dry SB3295 (MF222) | 0.2134 |

As can be seen from the above data, although the four final formulations have identical compositions, their A Values and their viscosities at low shear rates (0.5 RPM, which reflects the yield value) are significantly different. This demonstrates the sensitivity of the formulation to method of preparation, even when identical equipment is used. The spores and enzymes comprise at least 20% of the formulation by weight, and because these are particles they would provide an additional contribution to viscosity, thereby increasing the viscosity of the final formulation over that of the gel. Consequently, this means that the breakdown in gel structure for Batch 1 was not as great as for the other batches.

Additionally, the A values of all of the final formulations in this Example 8 are considerably higher than the A value for the final formulation of Example 7 (A=46756 cP). This could be a reflection of the lower weight percent of Konasil K-200 used for the formulation in Example 7 (1.920%) versus Example 8 (2.247%), or a result of the different manufacturing conditions, or a combination of both.

Example 9

An organogel was prepared on a laboratory scale. First, a gel was prepared in a tank using mineral oil (Britol 50) as the organic solvent, Konasil K-200 as the fumed silica gelling agent, and a pigment (Solvaperm Blue 2B). The final composition of this mixture was 97.351% Britol 50, 2.496% Konasil K-200, and 0.153% Solvaperm Blue 2B. This mixture was exposed to high shear conditions in a kitchen blender in order to disperse the Konasil K-200. The resulting viscosity data of the gel (not the final formulation) is given below. The viscosities of the gel were measured at 20° C. as a function of Spindle rotations per minute (RPM) using a Brookfield RVDV-E viscometer, using Spindle #27 and the SC4-13R Sample Container.

| RPM | Viscosity (cP) |
|---|---|
| 100 | 2363 |
| 60 | 3183 |
| 50 | 3555 |
| 30 | 4950 |
| 20 | 6500 |
| 12 | 9460 |
| 10 | 10850 |
| 6 | 16250 |
| 5 | 18850 |
| 4 | 22630 |
| 3 | 28750 |
| 2.5 | 33600 |
| 2 | 40800 |
| 1.5 | 52500 |
| 1 | 75000 |
| 0.6 | 117500 |

-continued

| RPM | Viscosity (cP) |
|---|---|
| 0.5 | 139500 |
| 0.3 | 213300 |

As was done for Example 7, these data were fit to a power-law function, giving A=72893 cP and n=−0.787. Note that for the power-law function, the value of A should correspond to the Viscosity value at 1 RPM. In this case, the value of A is only −2.809% different from the value of the Viscosity at 1 RPM, again validating the use of the power-law function to fit the viscosity data. In this case, only enzymes Alpha Amylase SC400, Savinase 16.0T, and Celluzyme 0.7T) were added to the gel and mixed by hand to produce a homogenous final formulation. The contribution of spores to the viscosity is very small compared with that of the enzymes because of the small relative percentage of spores in comparison to enzymes in the formulation.

The viscosity data for the final product was obtained in the same way as the viscosity for the gel, as well as the A Value and the n value, and the data are given below.

| RPM | Viscosity (cP) |
|---|---|
| 12 | 18600 |
| 10 | 21880 |
| 6 | 33460 |
| 5 | 39500 |
| 4 | 49440 |
| 3 | 61250 |
| 2.5 | 70900 |
| 2 | 83800 |
| 1.5 | 108000 |
| 1 | 154000 |
| 0.6 | 245800 |
| 0.5 | 289500 |
| 0.3 | 461700 |
| A Value (cP) | 157858 |
| n | −0.863 |

The final composition of the final product was identical, and is given below.

| Component | Weight Percent |
|---|---|
| Britol 50 | 76.350 |
| Konasil K-200 | 1.958 |
| Solvaperm Blue 2B | 0.120 |
| Alpha Amylase SC 400 | 6.075 |
| Savinase 16.0T | 2.600 |
| Celluzyme 0.7T | 12.096 |

For this final formulation, the viscosity (A value) is much higher (157858 cP) in comparison to that of the gel used to make the final formulation (72893 cP). If the gel structure was not broken down at all during the addition of spores and enzymes, this viscosity increase would be expected. The spores and enzymes are particles that comprise about 20% of the formulation, and would provide an additional contribution to viscosity. However, this formulation was made in the laboratory and the enzymes were added with gentle hand-stirring. This means that the gel structure is not likely to be broken down because of the gentle hand stirring. For formulations prepared at pilot scale or manufacturing scale, this is not the case (Example 7, Example 8). Although the ribbon blender provides a gentle means of mixing in the spores and enzymes for the conditions employed, the force applied by the blender must be still high enough to break down the gel structure to certain extent. Additionally, the particles (spores and enzymes) act as small projectiles that, when stirred, also would be expected to break down the gel structure.

Example 10

The dependence of viscosity (as A value) on high-shear mixing time was investigated by preparing a gel as described in Example 9, except that the content of Britol 50 was 97.650%, the content of Konasil K-200 was 2.197%, and Solvaperm Blue 2B was 0.153%. It is expected that the viscosity would decrease with increasing mixing time. This is indeed the case, as shown below for various mixing times. The viscosity was measured, and A values determined, as done for Example 9.

Figure 2:
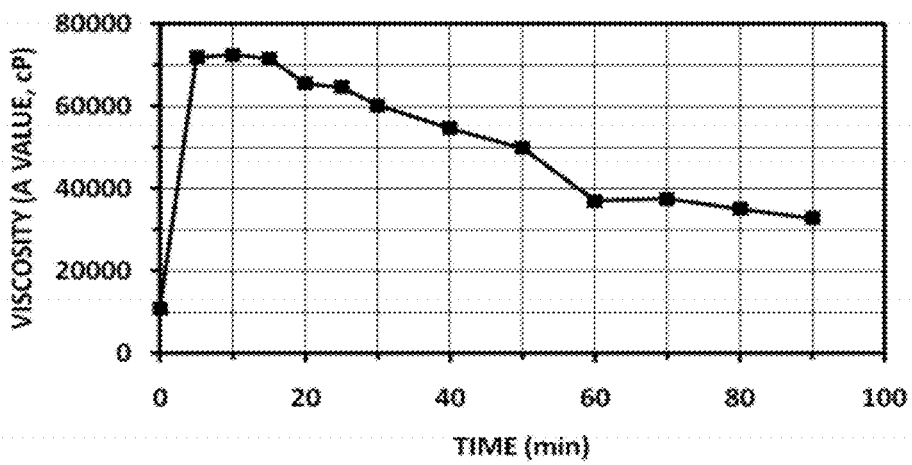
FIG. 2 is a graphical representation illustrating the dependence of viscosity (A value, basically equivalent to the viscosity measured at 1 rpm), at 20° C., as a function of high-shear mixing time.

As shown in FIG. 2, at 0 mixing time, the viscosity is due mainly to the interaction of Britol 50 and undispersed fumed silica (Konasil K-200). At longer mixing times between 5 and 15 minutes, the fumed silica becomes optimally dispersed. At mixing times longer than 15 minutes, the fumed silica becomes progressively over-dispersed, which would eventually lead to the gel being unable to suspend spores and enzymes once they are mixed into the gel. Consequently, mixing times for the gel under the high-shear conditions (speed and equipment) should not exceed 15 minutes. However, for the preparation of the gel under manufacturing conditions, the time required for optimal dispersion will have to be determined on a case-by-case basis, depending on the equipment used. A plot similar to that shown in FIG. 2 will have to be generated depending on the equipment and of course the volume of gel that will be prepared. This can quickly and easily be done in process by starting the high-shear mixing, stopping at intervals of a few minutes, measuring the viscosity at 1 RPM (this is equivalent to the A value, but does not require a great deal of time to measure viscosity as a function of RPM and perform the fitting procedure). Once the viscosity begins to decrease slightly, the dispersion conditions will be very near optimal, close enough to proceed with adding the spores and enzymes (provided the viscosity is adequately high). The mixing time can be further optimized by decreasing it appropriately for the next run, provided of course that the volume of gel being prepared is the same. After all, the dispersion of fumed silica for a given viscosity depends on the energy input into the system, which depends on equipment used, shearing time and power, and volume of product being produced.

Example 11

Figure 3:
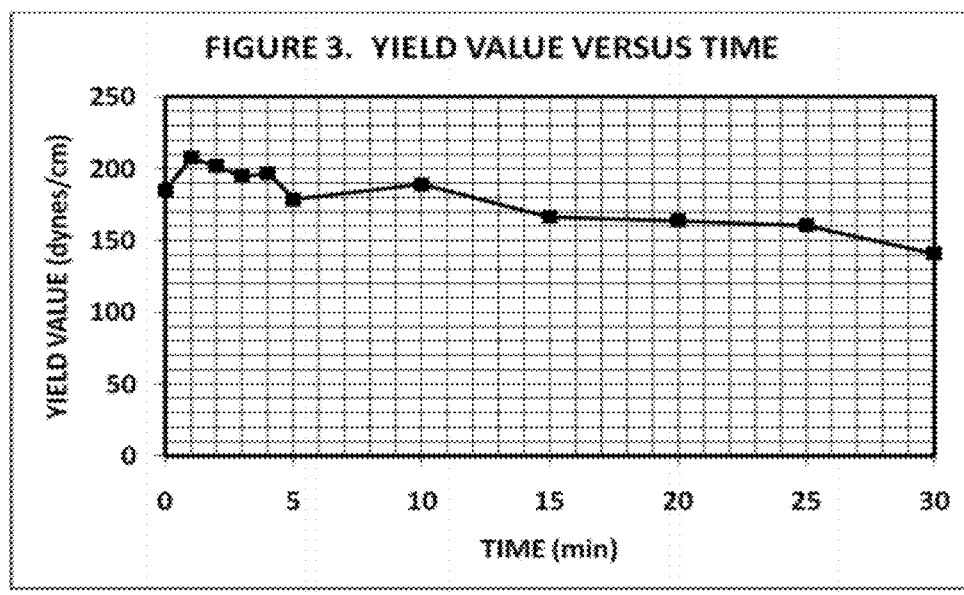
FIG. 3 is a graphical representation illustrating the dependence of yield values, at 20° C., as a function of high-shear mixing time.

The dependence of yield value and viscosity (as A value) on high-shear mixing time were investigated by preparing a laboratory-scale gel as described in Example 10. Yield value, as mentioned previously, is responsible for the ability of the gel to suspend spores and enzymes, which are particles. Consequently, it is important to determine whether or not yield value is affected by the time that the gel is exposed to high-shear mixing. We calculated the yield value from viscosity data (measured as described in Example 9) based on a publication (R. L. Bowles, R. P. Davie, W. D. Todd, Interpretation of Brookfield Viscosities, Modern Plastics 33 (1955) 140-148. The yield values are presented as a function of high-shear mixing time in FIG. 3.

As is well known, yield values calculated from Brookfield viscometer data is indirect and can be misleading. As a check, we sent samples produced in the same manner as those in this example to Brookfield Engineering (Middleboro, Mass.) to have three yield values determined directly. The yield values determined were 194.6, 178.4, and 126.1 dyne/cm², which are clearly within the range of the yield values that we measured. Consequently, we can use the Brookfield viscometer to measure yield values indirectly.

Figure 4:
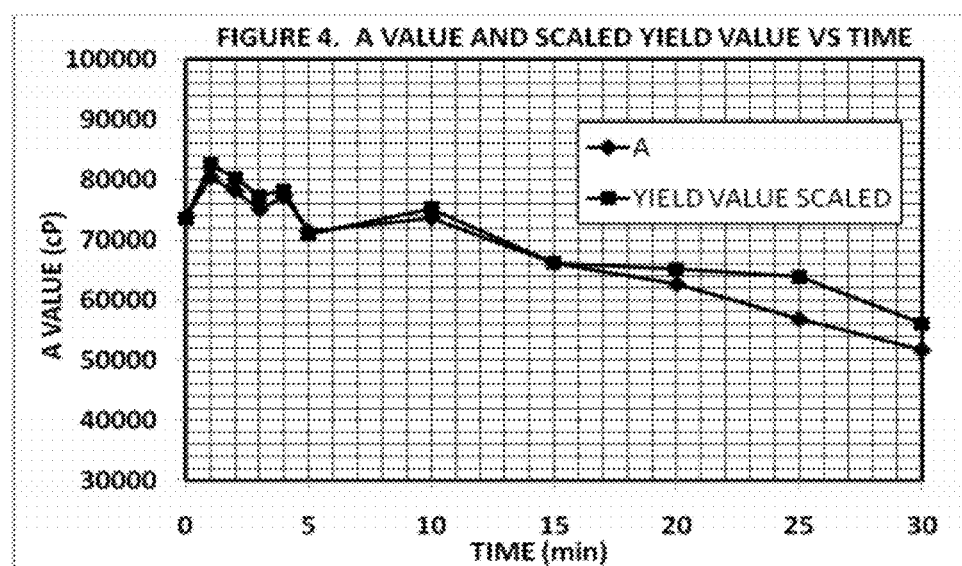
FIG. 4 is a graphical representation illustrating the dependence of viscosity and scaled yield, at 20° C., as a function of high-shear mixing time.

To further investigate any link between the A value and the yield value obtained from the same data, we plotted A value in FIG. 4 from the same viscosity data used to obtain the yield value to obtain the A value. The A value is plotted in FIG. 4 as a function of high shear time. Also plotted in FIG. 4 is the yield value from FIG. 3, but in FIG. 4, all the yield values are scaled by a single factor to allow direct comparison with the A value. The yield values, of course, retain the same units as in FIG. 3 (not shown in FIG. 4).

FIG. 4 clearly shows that the yield value follows the A value so closely as to make it adequate to only report an A value. Typically, no sedimentation problems have been noticed as long as the A value is 80,000 cP or greater for the final formulation produced on a pilot-scale or a manufacturing scale. Based on experience with respect to the decrease in viscosity observed after the addition of spores and enzymes, this means that the gel used to make the final product should not have an A value less than 110,000 cP.

Example 12

In our experience with final formulations (manufacturing scale or pilot scale), particles will sediment if the A value is about 80,000 cP or less. Furthermore, a thin layer of liquid appears on the top of the gelled full formulation (with spores and enzymes). This thin layer consists of Britol 50, and is a result of syneresis. Syneresis can occur for final products of even higher A values and is a result of external pressure placed upon the final formulation by the weight of the formulation itself, the spores and enzymes, and particularly motion when the final formulation is transported. Minimizing or elimination of syneresis would be beneficial to processing the final formulation because the liquid layer contains no active ingredients (spores or enzymes). The final formulation would typically be pumped into packages consisting of at least one water-soluble film, and absence of a portion of the final formulation will not have active ingredients unless care is taken to mix the liquid layer back into the gelled product.

One approach to minimizing or eliminating syneresis would be to not allow the gel to become over-dispersed. Another approach would be to add the spores and enzymes with as slow of a stirring (ribbon blender) speed as possible, and for as little time as possible to evenly disperse the spores and enzymes, again with the objective of not over-dispersing the gel part of the final formulation. Yet another approach that could be used would be to add fumed silica to cover the top of the final formulation while in its shipping package (ie. tote). FIG. 2 and FIG. 4 show that even at zero time exposure to high-shear mixing, a mixture of fumed silica (Konasil K-200) and mineral oil (Britol 50) has significant viscosity (A value). In the laboratory, we found that about 5% of fumed silica (Konasil K-200) by weight was required to gel mineral oil (Britol 50). Under manufacturing conditions, we found that a typical liquid layer represented about 1% of the final formulation. A typical tote contains 2000 pounds of final product. Consequently, the laboratory results would predict that 20 pounds of a liquid layer would result, thereby requiring 1 pound of fumed silica (Konasil K-200). In practice, we found that 0.5 pounds was adequate to blend in with the final product without having a liquid layer form on top, and without having excess fumed silica on top of the final product. Fumed silica becomes easily airborne (and therefore an inhalation hazard). The 0.5 pounds of fumed silica on the top of this product, in this case, would be expected to control syneresis while the product is shipped, which is expected to be the largest contribution to syneresis. In other cases involving 2000 pounds of final formulation, the amount of fumed silica placed on top of the final formulation could be determined by initially placing 1 pound of fumed silica on top of the final formulation. The final formulation with the excess fumed silica would then be left at room temperature, and then in time period of several days before shipping be observed. If there is excess free (not-gelled) fumed silica on top of the final formulation, the excess fumed silica would be removed so that very little, if any, excess would remain.

The present invention is described by the following numbered paragraphs:

1. A flowable, organic-based gel for treatment of wastewater, comprising:
    (a) at least one flowable, organic gel forming ingredient,
    (b) a wastewater treatment effective amount of at least one biologically-active ingredient, wherein the at least one biologically-active ingredient is stably and uniformly suspended in the gel and is concentrated so as to be present in the gel in an amount of about 15% to about 45% by weight of the gel, and wherein gel has a shear-thinning viscosity and a yield value such that:
        (i) the least one biologically-active ingredient does not redistribute in the gel (other than from diffusion effects) and thus remains substantially uniform in the gel during standing and until the force of gravity of buoyancy is applied that exerts a force greater than the yield stress (from yield value), and
        (ii) the gel is a flowing liquid when in contact with an aqueous environment of the wastewater.
2. The gel of paragraph 1, wherein the gel is phase-stable from 5° C. to 45° C. and also remains phase-stable when subjected to at least one freeze-thaw cycle.
3. The gel of paragraph 1, wherein the at least one organic gel forming ingredient is at least one organic solvent and at least one gelling agent.
4. The gel of paragraph 1, wherein the organic solvent is biodegradable, more preferably anaerobically biodegradable.
5. The gel of paragraph 1, wherein the organic solvent is a chemical compound or mixture of compounds containing (1) a vapour pressure less than 0.1 mm Hg at 20° C., (2) composed of chemical compounds with more than 12 carbon atoms; and/or (3) a boiling point greater than 216° C.
6. The gel of paragraph 1, wherein the organic solvent is selected from the group consisting of a mineral oil, hexylene glycol, glycerol, linoleic acid, oleic acid or any combination thereof.
7. The gel of paragraph 1, wherein the gelling agents are selected from the group consisting of hydrophobically-modified clays, surface modified silicas, or a fumed silicas.
8. The gel of paragraph 1, wherein the at least one biologically-active ingredient comprises multiple enzymes and/or multiple microorganisms.
9. The gel of any of paragraphs 1-8, wherein the at least one biologically-active ingredient comprises at least one enzyme selected from the group consisting of one or more amylases, proteases, cellulases, lipases and any combination thereof.
10. The gel of any of paragraphs 1-8, wherein the at least one biologically-active ingredient comprises at least one microorganism selected from the genus *Bacillus, Cellulomonas, Paenibacillus, Pseudomonas*, and any combination thereof.

11. The gel of any of paragraphs 1-10, wherein the at least one biologically-active ingredient comprises at least one microorganism which is in the form of stable bacterial spore(s).

12. The gel, any of paragraphs 1-11 wherein the gel is a flowing liquid when subjected to manufacturing or packaging conditions of pumping, mixing and/or pouring.

13. The gel of paragraph 1, wherein the gel does not comprise an enzyme stabilizer (e.g., borate).

14. The gel of paragraph 1, wherein the gel further comprises one or more a rheology modifying agents (e.g., thickeners), preservatives, coloring agents (e.g., pigments or dyes), opacifiers, fragrances, fillers, pH adjusting agents, stabilizers, builders, buffers, antioxidants, surfactants or micronutrients.

15. The gel of paragraph 1, wherein the wastewater is a septic tank, cesspool, or sewage system.

16. The gel of paragraph 1, wherein the gel is further contained in a water soluble container comprising at least one water soluble film.

17. The gel of paragraph 16, wherein the water soluble container further comprises one or more an additional films (preferably, one or more additional water soluble films).

18. The gel of paragraphs 1-17, wherein syneresis is regulated by controlling the addition of the at least one biologically-active ingredient to the gel.

19. The gel of paragraphs 1-18, wherein syneresis is regulated by adding fumed silica to the final formulation.

20. The gel of paragraph 1-19, wherein the gel is prepared under high-shear conditions and under low-shear conditions.

21. The gel of paragraph 20, wherein the gel is prepared under high-shear conditions before the at least one biologically-active ingredient is added and under low-shear conditions after the at least one biologically-active ingredient is added.

It will be understood that the Specification and Examples are illustrative of the present invention and that other embodiments within the spirit and scope of the invention will suggest themselves to those skilled in the art. Although this invention has been described in connection with specific forms and embodiments thereof, it would be appreciated that various modifications other than those discussed above may be resorted to without departing from the spirit or scope of the invention as defined in the appended claims. For example, equivalents may be substituted for those specifically described, and in certain cases, particular applications of steps may be reversed or interposed all without departing from the spirit or scope for the invention as described in the appended claims.

The invention claimed is:

1. A composition of a gel and a biologically-active ingredient for treatment of wastewater, comprising:
   (a) the gel that includes;
      (i) an organic solvent selected from the group consisting of a mineral oil, hexylene glycol, glycerol, linoleic acid, oleic acid, and combinations thereof, and
      (ii) a gelling agent selected from the group consisting of hydrophobically modified clays, surface modified silicas, fumed silicas, and combinations thereof;
      wherein the gel is formed by mixing the organic solvent and the gelling agent under high-shear conditions until the gelling agent becomes optimally dispersed and wherein the gel has an A value of at least about 110,000 cP; and
   (b) the biologically-active ingredient that includes an enzyme or a microorganism present in the gel in an amount of about 15% to about 45% by weight of the gel;
      wherein after the gel is formed the biologically-active ingredient is mixed with the gel under low-shear conditions until homogeneously distributed throughout the gel, and wherein the composition has an A value of at least about 80,000 cP.

2. The composition of claim 1, wherein the organic solvent is mineral oil.

3. The composition of claim 1, wherein the gelling agent is a fumed silica.

4. The composition of claim 2, wherein the gelling agent is a fumed silica.

5. The composition of claim 4, wherein the composition is phase-stable from 5° C. to 45° C. and also when subjected to at least one freeze-thaw cycle.

6. The composition of claim 4, wherein the biologically-active ingredient is at least three enzymes and at least one microorganism, wherein the three enzymes are an amylase, a cellulase, and a protease.

7. The composition of claim 4, wherein the biologically-active ingredient is at least four enzymes and at least one microorganism, wherein the four enzymes are an amylase, a cellulase, a lipase, and a protease.

8. The composition of claim 4, wherein the composition is a flowing liquid when subjected to manufacturing or packaging conditions of pumping, mixing and/or pouring.

9. The composition of claim 4, wherein the composition does not comprise an enzyme stabilizer.

10. The composition of claim 4, wherein the composition includes an enzyme stabilizer that is borate.

11. The composition of claim 4, wherein the composition further comprises one or more rheology modifying agents, preservatives, coloring agents, opacifiers, fragrances, fillers, pH adjusting agents, stabilizers, builders, buffers, antioxidants, surfactants or micronutrients.

12. The composition of claim 4, wherein the wastewater is derived from a septic tank, cesspool, or sewage system.

13. A container containing the composition of claim 4, wherein the container is a water soluble container which comprises at least one water soluble film.

14. The composition of claim 4, wherein the biologically-active ingredient includes an enzyme and a microorganism.

15. The composition of claim 4, wherein the organic solvent is present at between about 51% and 78% by weight of the composition, and the gelling agent is present at between about 1.8% and 2.3% by weight of the composition.

16. The composition of claim 4, additionally including a coloring agent.

17. The composition of claim 14, wherein the microorganism is selected from the group consisting of Bacillus, Cellulomonas, Paenibacillus, Pseudomonas, and combinations thereof.

18. The composition of claim 14, wherein the microorganism is in the form of stable bacterial spore(s).

19. The composition of claim 14, wherein the enzyme is present at between about 19% and 44% by weight of the composition, and the microorganism is present at between about 0.1% and 2.2% by weight of the composition.

20. A composition of a gel and a biologically-active ingredient for treatment of wastewater, comprising:
   (a) the gel that includes;
      (i) mineral oil present at between about 51% and 78% by weight of the composition; and (ii) fumed silica present at between about 1.8% and 2.3% by weight of the composition;
wherein the gel is formed by mixing the mineral oil and the fumed silica under high shear conditions until the fumed silica becomes optimally dispersed, and wherein the gel has an A value of at least about 110,000 cP; and (b) the biologically-active ingredient, that includes an enzyme present at between about 19% and 44% by weight of the composition, and a microorganism present at between about 0.1% and 2.2% by weight of the composition;

wherein the biologically-active ingredient is mixed with the gel under low-shear conditions until homogeneously distributed throughout the gel, and wherein the composition has an A value of at least about 80,000 cP.

* * * * *